(No Model.) 2 Sheets—Sheet 1.
M. M. MONSANTO, Dec'd.
E. M. MONSANTO, Administratrix.
APPARATUS FOR THE MANUFACTURE OF SALT.
No. 496,615. Patented May 2, 1893.
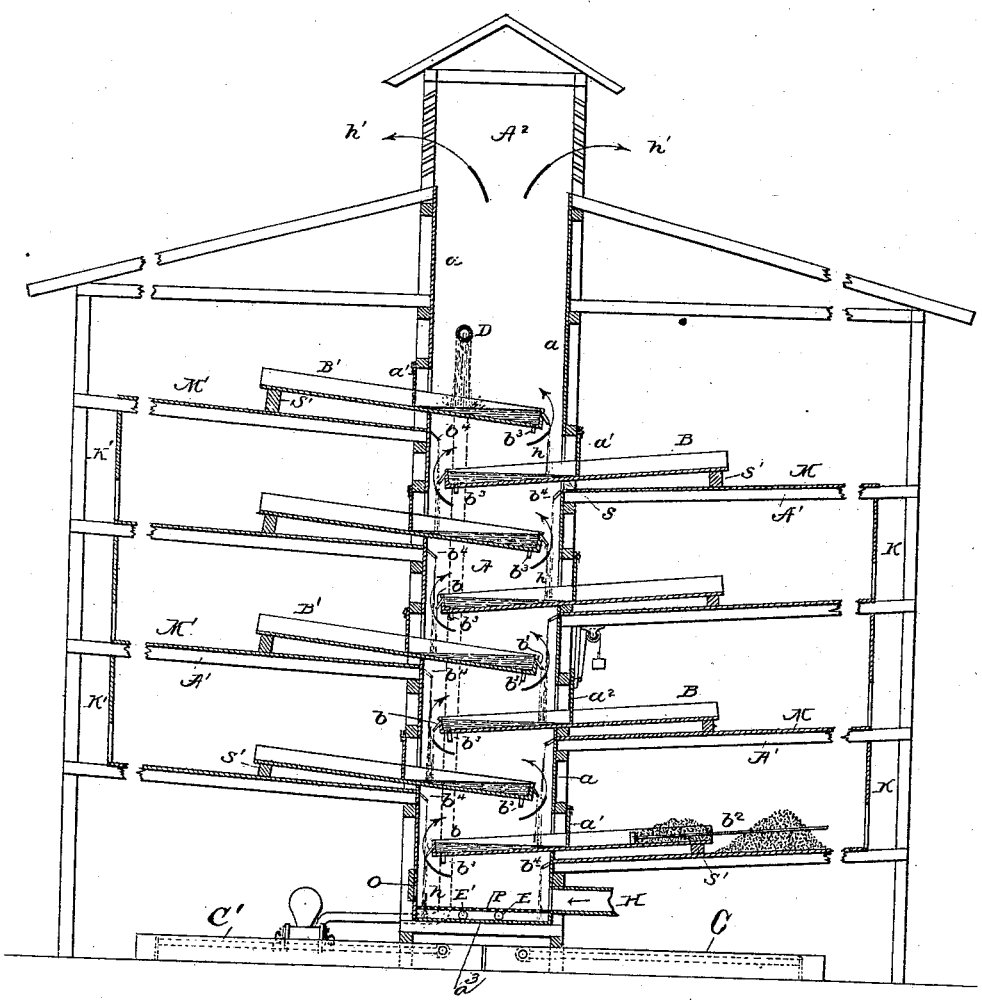
Witnesses:
Inventor:
Mauricio M. Monsanto.
by
his Attorney.

(No Model.) 2 Sheets—Sheet 2.
M. M. MONSANTO, Dec'd.
E. M. MONSANTO, Administratrix.
APPARATUS FOR THE MANUFACTURE OF SALT.
No. 496,615. Patented May 2, 1893.
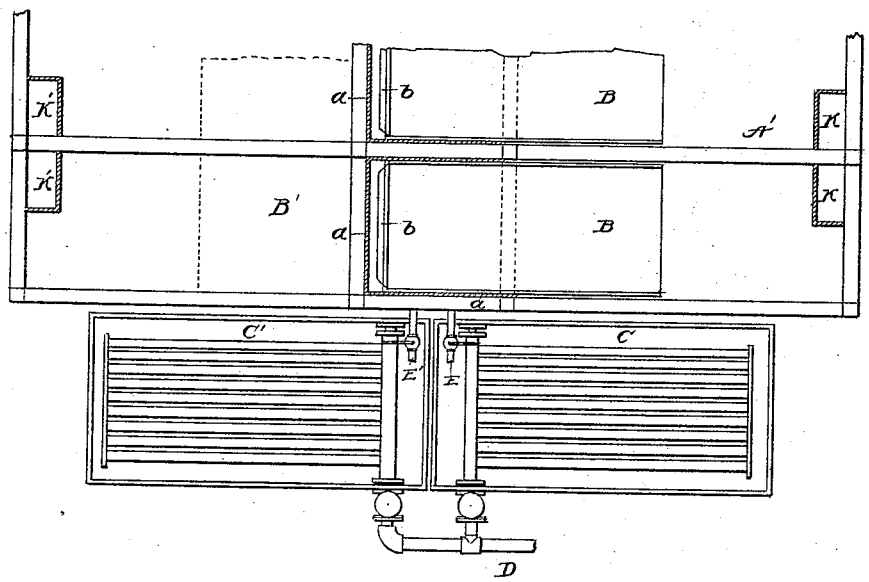
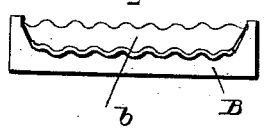
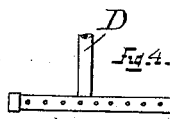
Witnesses:
Inventor:
Mauricio M. Monsanto,
by
his Attorney.

UNITED STATES PATENT OFFICE.

MAURICIO M. MONSANTO, OF NEW YORK, N. Y.; EMMA M. MONSANTO ADMINISTRATRIX OF SAID MAURICIO M. MONSANTO, DECEASED.

APPARATUS FOR THE MANUFACTURE OF SALT.

SPECIFICATION forming part of Letters Patent No. 496,615, dated May 2, 1893.

Application filed December 22, 1886. Serial No. 222,299. (No model.)

*To all whom it may concern:*

Be it known that I, MAURICIO M. MONSANTO, a citizen of the United States of Colombia, residing at New York city, in the county of New York and State of New York, have invented certain new and useful Improvements in Apparatus for the Manufacture of Salt; and I do hereby declare the following to be a full, clear, and exact description of the invention, such as will enable others skilled in the art to which it appertains to make and use the same.

It is well known, that the methods now in common use for the manufacture of salt from the brine, in open pans or kettles by means of direct heat, or in grainers or pans, by means of steam, are very deficient in economy of fuel and labor, and yield but a very imperfect and impure product; that the peculiar nature of salt, which rusts iron with which it comes in contact, thereby discolors the salt, and yields an inferior product; that the salt crystallizes or separates from the mother-liquor immediately upon the brine being evaporated or vaporized beyond its point of saturation, and adheres to the sides of the vessel, or to the heating surface thereof; and that all salt brines contain salts other than that of chloride of sodium, which also separate upon concentration, and which subside and adhere to the heating surface of the boiling apparatus, forming scale, which impairs its efficiency and prevents the conduction of heat, requiring time and labor for its removal, and that closed apparatus, steam or vacuum, have not been found as advantageous in the salt, as in the sugar and other industries.

In warm climates, salt is made from sea water by natural or solar vaporization in suitable ponds, where, by means of the steady trade winds, absorbing the vapors of the brine which has been heated by the sun, the latter becomes concentrated until the contained salt crystallizes. In other localities various kinds of apparatus for solar evaporation have been introduced, of which some consist of brine tanks covered by movable roofs, which are rolled from the tanks upon rails or otherwise, exposing the brine in the tanks to the solar rays in good weather, and covering them when desirable; and it is well known that the salt made by solar evaporation is the purest and the best.

The object of my invention, in imitation of the natural or solar vaporization, is an apparatus in which previously heated brine or brine not heated is pumped to a vaporizing tower, with closed sides, and allowed to fall upon inclined trays or troughs, placed therein, which overflow upon each other in zig-zag course, forming thereby showers of heated brine in thin sheets, or in a very subdivided condition, nearly the full height of the tower; while air is admitted at the bottom of the trays, either with natural draft, or preferably by means of forced draft with previously heated air, because it will absorb proportionately more moisture, going upward and in contrary direction to that of the brine, and, coming in consecutive contact with the showers of brine from tray to tray, becomes thereby saturated with the vapors of the brine, the brine becoming vaporized and concentrated, while the salt separates and crystallizes in said trays and is raked out to dry or to be forwarded to centrifugal machines.

It will be understood that great economy of fuel will result from artificially abstracting the vapors of the heated brine by means of air, and more so by means of heated air, while the air can be heated without cost of fuel by piping placed in a spent heat conduit of steam boilers or other furnaces, before entering the chimney.

In the accompanying drawings: Figure I represents a broken cross section of the vaporizing tower with a suitable building attached, and Fig. II represents a broken horizontal section of the same. Fig. III is a detail view of a corrugated lip, such as would be used when it is desired to cause the brine to fall in small streams. Fig. IV is a detail view of a distributing device.

Similar letters indicate corresponding parts.

A designates the tower, rising from the ground floor or foundation, or otherwise, and made preferably of wooden frame-work, or of any suitable building material boarded or inclosed all around at "a."

A' are beams carrying the flooring M, and M' preferably inclined toward the tower, A, for the drainage of the salt, and having the drip-pipes $b^4$, which return any brine which may separate from the raked salt. To the tower are secured doors $a'$ to allow of the raking of the trays B and B' without destroying the draft of air rising within the tower; instead of hinged doors, sliding doors with pulleys, chains and weights may be employed, as shown at $a^2$.

B and B' are trays or troughs, preferably made of wood, and preferably lined with composition or other metal or material that is not attacked by the salt, extending the width of the tower, and extending lengthwise to about, or more than, double its width and being held in suitable position by fixed or detachable supports S and S', the latter resting on the flooring M, M' and to which the troughs B and B' may be suitably made fast; and having one end, that outside of the tower, from which the salt, if desired, may be raked out. Thus the trays may be placed at the most convenient angle for raking out the salt, as well as for its drainage on the highest part of the trays, beyond the level line of the brine, as shown.

$b$ and $b'$ are lips at the overflow line of the inclined trays B and B', a little below the rim of the trays, which are made to contract somewhat the width of the overflow sheet, to prevent spattering sidewise, as the brine falls successively, and in a zig-zag course, from one tray to the other. These lips are made, either to allow the overflow to fall in a thin sheet of brine, or corrugated, so as to make the overflow fall in small streams or in the form of rain.

C and C' are steam brine heaters, which I would prefer to use in a new plant, with copper pipes connected to a trunnioned steam trunk, so that the heating pipes may be raised for a thorough and easy cleaning; but the brine heaters may be of any suitable system, operated by fire or steam, and in existing plants, the salt pans, kettles or grainers may serve as brine heaters. The heaters are connected to a pump (shown in Fig. I of the drawings) which elevates the heated brine to a distributing pipe D, or to a tank which feeds the distributing pipe, placed above the highest tray, which pipe may be perforated or slotted in a suitable manner, or may be attached to a separate distributing device such for instance as that shown in Fig. IV of the drawings, so that the heated brine may fall upon the highest tray in a subdivided form, and thus may offer, as in the subsequent falls from tray to tray, a large area of contact for vaporization to the ascending air.

H is the inlet of air into the tower, entering into the compartment below the lowest tray, which may be inducted by the natural draft of the tower, or, preferably, by forced draft by means of a suitable mechanism; the air being preferably heated in a spent heat conduit, or otherwise, before arriving at the tower. The air need not be heated artificially, but forced draft of ordinary air may be used, if desired, and, as will be seen in Fig. I, from the arrows representing the course of the air, it ascends in zig-zag direction in a contrary direction to that of the descending brine, and coming thereby in contact with the latter, especially at the falls, $h$, becomes saturated with its vapors, and ultimately leaves the tower at its upper ventilating portion $A^2$ by means of shutters, movable skylights, or other known means.

O is a manhole which permits of entering the lowest compartment for cleaning or taking out any salt which may have been retained by the wire screen P, or otherwise. When the trays B and B' are to be emptied, the plugs $b^3$ are withdrawn and the brine contained in the trays will drain from the upper to the lower tray, and will arrive at the lowest compartment of the tower, and pass through the strainer P, and will finally be discharged through the pipes E and E', which return the brine to the heater or to a reservoir, from which it can be conveyed again to the upper part of the tower for further vaporization.

A series of towers to any desired number may be placed and thus be contained in a single building, and in such case the air from one tower may by forced draft and suitable connections be made to pass through a second tower, and so on, thus availing of the original heat and that absorbed in passing through the heated brine through which it first passed.

The operation of raking salt may be performed by hand, but may also be performed by known automatic, or other mechanical means. The salt, as it is raked out, may be allowed to stand for some time at the high part of the trays, beyond the level line of the brine, as shown at $b^2$, until drained, or it can be raked onto the inclined flooring M, M' where the water, which may separate from the green salt, may drain back into the tower by means of the drip-pipes $b^4$; after which operation it may be spread on the flooring to dry, and further disposed of by a system of chutes, as shown at K and K', by conveyers, or other mechanical means; or it can be conveyed, as soon as raked, to a mixer and centrifugals, where it can be washed with saturated brine, of adhering foreign matter, and dried by centrifugal force, ready for barreling.

Some other advantages of my system and apparatus for manufacturing salt by vaporization are inexpensive works, great economy in fuel and in labor, superiority of product; cleanliness of manufacture; exemption from the employment of iron; repairs reduced to a minimum; no stopping to chip out pan scale nor on account of burned out salt pans, nor for resetting of the same; the work can be conducted by day only, if so desired, (as any steam boiler,) instead of day and night, as is indispensable in the present systems; the salt cannot be burned as in salt pans.

I do not desire to confine myself to the precise construction of parts described, for these constructions may be varied in many ways to produce like results, without departing from the spirit of my invention.

Having thus described my invention, what I claim as new, and desire to secure by Letters Patent, is—

1. The combination with the vaporizing tower, of the inclined trays, the floorings, and the conveyers or chutes, substantially as described.

2. In an apparatus for manufacturing salt, the vaporizing tower having the air inlet and outlet openings and the feed pipe, in combination with the trays having their inner ends extending into the tower and their outer ends supported on the flooring outside of the said tower, substantially as described.

3. In an apparatus for manufacturing salt, the vaporizing tower, the supply pipe, and the inclined trays having their outer ends open to permit access to the said trays for the purpose of removing the salt, in combination with the chutes for delivering the same, for the purpose set forth, substantially as described.

4. The combination with the vaporizing tower, of the inclined trays having their inner ends arranged therein and their outer ends supported outside of the same, the conveyers or chutes situated near the said outer ends of the inclined trays, and the inclined flooring having drip pipes substantially as and for the purpose described.

5. The combination with the vaporizing tower having means for supplying brine thereto, of the inclined trays having their inner ends extending into the tower, and their outer ends supported outside of the same, substantially as described.

6. The combination with the vaporizing tower provided with means for supplying brine thereto, of the inclined trays arranged therein and supported outside of said tower, to receive the brine, and means for conveying the brine from the tower, substantially as and for the purpose described.

7. The combination with the vaporizing tower A, composed of a frame having covered sides, a bottom $a^3$ and the upper ventilating portion $A^2$ for the outlet of the saturated air, of the inclined trays B and B', resting on the supports S and S', and provided with the lips $b$ and $b'$, and plug holes and plugs at their lower ends, and the inclined flooring having drip-pipes, substantially as described.

In testimony whereof I affix my signature in presence of two witnesses.

MAURICIO M. MONSANTO.

Witnesses:
JNO. C. TEN EYCK,
WILLM. SMITH.